(12) United States Patent
Hodges et al.

(10) Patent No.: US 6,523,085 B1
(45) Date of Patent: Feb. 18, 2003

(54) DISK DRIVE AND METHOD OF MULTI-BLOCK SIZE ADDRESSING

(75) Inventors: Paul Hodges, Los Gatos, CA (US); Bernd Lamberts, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/456,850

(22) Filed: Dec. 8, 1999

(51) Int. Cl.$^7$ ................................ G06F 12/00
(52) U.S. Cl. .................... 711/112; 711/154; 711/202
(58) Field of Search ................ 711/112, 113, 711/154, 202, 208, 217

(56) References Cited

U.S. PATENT DOCUMENTS

| | | | |
|---|---|---|---|
| 4,428,064 A | * 1/1984 | Hempy et al. | 711/113 |
| 4,531,163 A | 7/1985 | Maerkl et al. | 360/49 |
| 5,237,675 A | 8/1993 | Hannon, Jr. | 395/425 |
| 5,386,402 A | 1/1995 | Iwata | 369/32 |
| 5,577,243 A | 11/1996 | Sherwood et al. | 395/607 |
| 5,715,418 A | 2/1998 | Atsatt et al. | 395/412 |
| 5,737,743 A | 4/1998 | Ooe et al. | 711/112 |
| 5,813,025 A | 9/1998 | Murphy et al. | 711/114 |
| 6,122,715 A | * 9/2000 | Palanca et al. | 711/154 |
| 6,249,842 B1 | * 6/2001 | Buch | 710/52 |

OTHER PUBLICATIONS

"Variable Block Paging for Virtual Memory" by T.A. Kriz, Vo. 27, No. 4B, Sep. 1984, pps. 2296–2298.
"Getting Beyong the ATA 8.4 GB Limit", Oct. 12, 1998, 3 pps.
"The Norton Utilities Version 5.0 Disk Explorer" 1190, 7 pps.

* cited by examiner

*Primary Examiner*—Matthew Kim
*Assistant Examiner*—Christian P. Chace
(74) *Attorney, Agent, or Firm*—Ohlandt, Greeley, Ruggiero & Perle, L.L.P.; Noreen Krall

(57) ABSTRACT

A disk drive that is enabled by information contained in a mode page and in a command to access data blocks of either a small size (e.g., 512 bytes) or of a large size (e.g., 4,096 bytes). This allows legacy application software written for 512 byte sized blocks to run without change. By turning on the 4,096 byte sized block flag in the command, new software written to obtain improved performance benefits may also be used with the disk drive. The dual block capability is implemented in software.

18 Claims, 3 Drawing Sheets

DISK DRIVE AND METHOD OF MULTI-BLOCK SIZE ADDRESSING

FIELD OF THE INVENTION

This invention relates to addressing of disk drives and, in particular to a disk drive, method and memory media that have a capability of addressing two or more sizes of blocks of data on the disk.

DESCRIPTION OF THE ART

In the past, disk technology has advanced at a rate that allowed increased density with little degradation of the read process, so that reliability of retrieving data has been relatively constant. Where degradation occurred, the solution was to use powerful error-correcting codes. Any redundancy associated with these codes was minor when compared to the disk capacity compound growth rate of about 60% per year.

It is expected in the future that recording density increases will stretch the limits of the technology. As this happens, reliable reading will depend strongly on enhanced error correcting codes that will require significantly more information in a data block to assure proper performance of the read process. Moreover, the overhead needed for clocking data, decoding data and correcting errors will be substantial. As most of this overhead is per block, rather than per byte, processing of short blocks will be much less efficient than that for longer blocks. The result is that users will not realize the full benefit of increased density in the future.

To address this situation, the National Storage Industry Consortium has proposed to increase the physical block size on a disk from a de facto standard of 512 bytes to 4,096 bytes. In the not too distant future, as recording densities reach 100 Gbits/in$^2$ with degraded raw error rates, the change to a 4,096-byte block size is expected to increase the disk capacity, as seen by a user, by 25% to 30%.

Any changeover to the 4,096-byte block size must consider the legacy software that is based on a 512-byte block size.

What is needed is a solution that allows legacy software based on 512 byte block size to continue to work with no change, while allowing new software based on a 4,096 byte block size to also work on the same disk drive.

SUMMARY OF THE INVENTION

The present invention provides such a solution with a change that allows both legacy software and new software to work concurrently in the same disk drive control system. The method of the invention stores a mode page that contains a first field signifying a native block size N. A command provided from a host computer is also stored. The command includes a command block size S, a command block address B and a command transfer length L. If the native block size N and the command block size S are equal, the command is executed using the command address B and the command transfer length L for accessing data. If the native block size and the command block size are unequal, the command block address and the command transfer length are converted to a conversion address and a conversion transfer length. The command is then executed using the conversion address and conversion length for data accesses. By allowing the command to carry the block size information, both legacy software using a data block size of 512 bytes as well as new software using a data block size of 4,096 bytes can both use the same disk drive with only a modest change that can be implemented in hardware, firmware or software.

The disk drive of the invention includes the hardware, firmware or software that implements the method of the invention. The memory media of the invention includes the software that controls the disk drive to perform the method of the invention.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF PREFERRED EMBODIMENT

Figure 1:
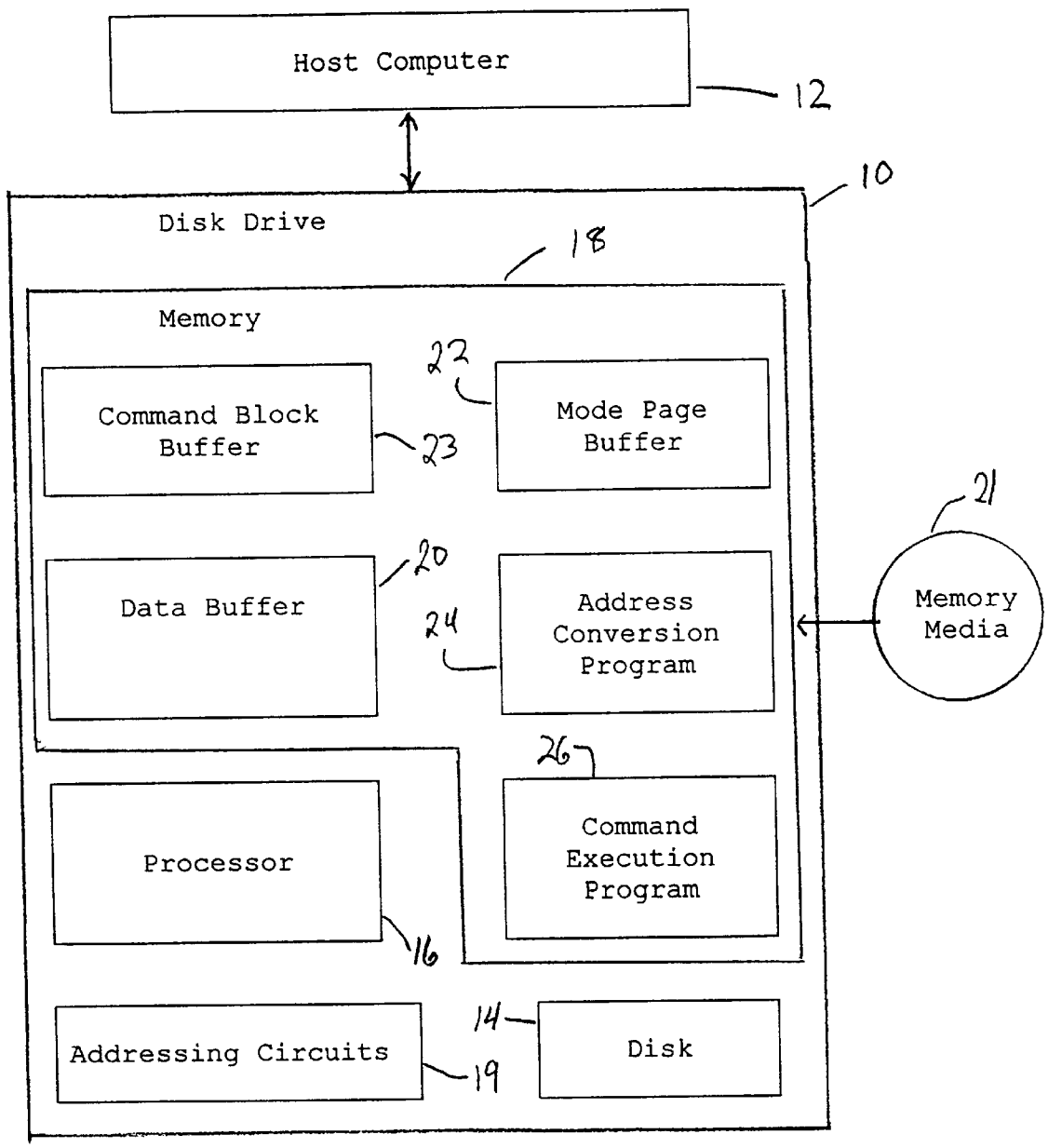
FIG. 1 is a block diagram of a disk drive according to the present invention.

Referring to FIG. 1, a disk drive 10 is coupled to a host computer 12. Disk drive 10 includes a disk 14, a processor 16, a memory 18 and addressing circuits 19. Disk 14, processor 16, memory 18 and addressing circuits 19 are conventional items. Memory 18 includes a data buffers area 20, a mode page buffer 22, a command block buffer 23, an address conversion program 24 and a command execution program 26.

While address conversion program 24 and command execution program 26 are shown as stored in memory 18, it is to be understood that these programs as well as other software used by disk drive 10 can be loaded into memory 18 from a memory media 21.

Host computer 12 includes one or more central processing units that run applications which utilize data that is stored on disk 14. For example, an application issues read and write commands to disk drive 10. Disk drive 10 manages and executes these commands by accessing storage locations of disk 14.

A command received from host computer 12 is stored in command block buffer 23. Command execution program 26 executes the command stored in command block-buffer 23. According to the present invention, command execution program, when accessing disk 14, uses a block address contained in the command or a conversion thereof based on information contained in mode page buffer 22 and command block buffer 23.

Figure 2:
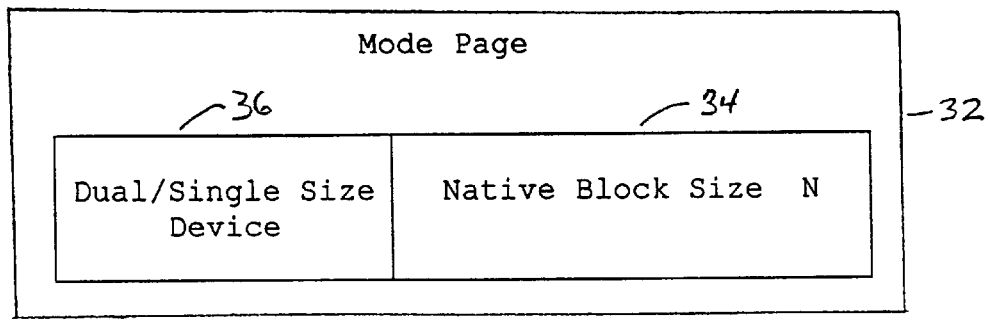
FIG. 2 depicts a portion of a mode page for the FIG. 1 disk drive.

With reference to FIG. 2, mode page buffer 22 stores a mode page 32. Mode page 32 generally includes a number of parameters that are used by command execution program 26 in executing commands received from host computer 10. In accordance with the present invention, mode page 32 includes a native block size field 34 and a dual/single size device field 36. Native block size field 34 signifies a block size of N bytes, for example, 512 or 4,096 bytes. Native block size field 34 mandates that disk drive 10 will access disk 14 with native block addresses of N bytes. Dual/single size device field 38 signifies if the disk drive is a single block or dual block size device. A single block size device is capable of executing commands only with data of its native block size.

Figure 3:
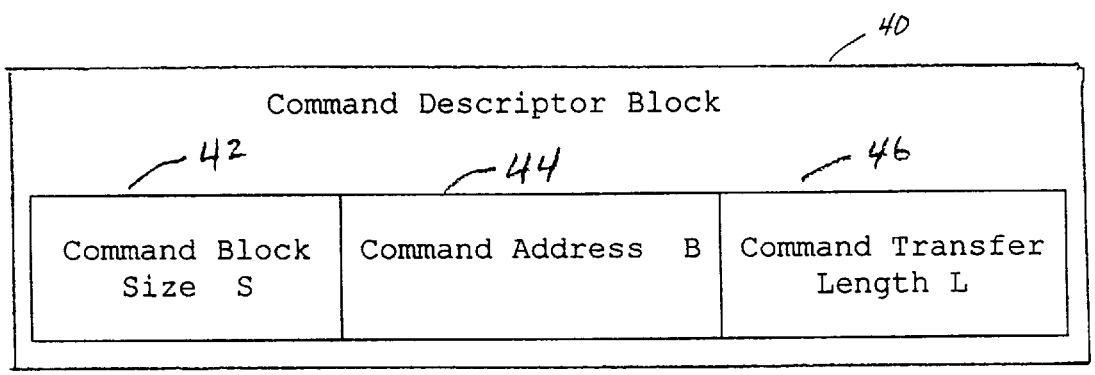
FIG. 3 depicts a portion of a command descriptor block for FIG. 1 disk drive.

With reference to FIG. 3, command block buffer 20 stores a command descriptor block 40. Command descriptor block 40 generally includes a command and a number of parameters that are used by command execution program 26 in executing the command. In accordance with the present invention, command descriptor block 40 includes a block size field for this command 42. That is, each command carries with it the block size of S bytes of data required by its initiating application program in host computer 12. Command descriptor block 40 also includes a command address field 44 that signifies the address B of the block of data for the command, where B is relative to the command block size S. Command descriptor block 40 further includes a command transfer length field 46 that signifies the transfer length L of the data in blocks of size S.

Figure 4:
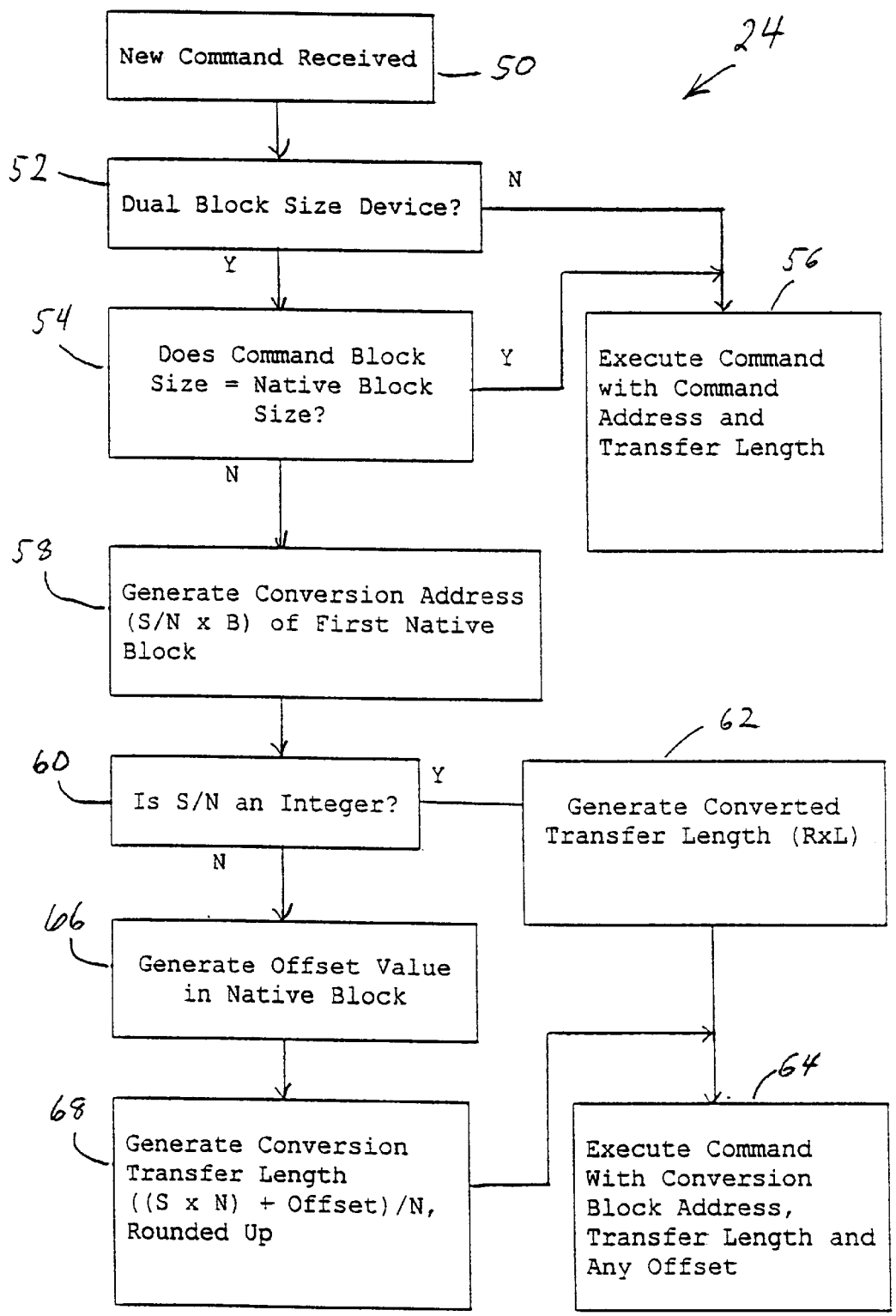
FIG. 4 is a flow diagram of an address conversion addressing procedure of the FIG. 1 disk drive.

Referring to FIG. 4, address conversion program 24 begins at step 50 with the receipt of a new command from host computer 12. At step 52, it is determined if disk drive 10 is a dual block size device or a single block size device. If disk drive 10 is a single block size device, step 56 causes command execution program 26 to execute the command with the command block address and command transfer length contained in the command. The command transfer length field signifies that the data for this command has a length of L blocks.

If step 52 determines that disk drive 10 is a dual block size device, step 54 then determines if the new command is for the native block size N. If so, step 56 causes command execution program 26 to execute the command with the command block address and command transfer length contained in the command. If step 54 determines that the command block size and the native block size are different (S and N are unequal), step 58 generates a conversion address. This address is the address of the first native block that has to be addressed for a disk access required by the command. The address is computed as command block size divided by native block size times the command block address or S/N×B.

Step 60 determines if command block size divided by native block size or S/N is an integer. For example, it is an integer when S=512 bytes and N=4,096 bytes. If S/N is an integer, step 62 causes processor 16 to generate a conversion transfer length (S/N×L), that is, the number of native blocks that need to be accessed on disk 14. Step 64 then executes the command using the conversion block address of the first native block generated by step 58 and the conversion transfer length generated by step 62 for access of data on disk 14.

If step 60 determines that S/N is not an integer, step 66 generates an offset value that is the number of bytes by which the command starting address is offset from the start address of the native block that contains the command starting address. This offset value is computed by first dividing the command block address B by the ratio N/S. This division yields a non-integral number with a fractional portion. The fractional portion or the decimal portion is then multiplied by the native block size to obtain the offset value. Thus if N=4,096, S=512, and B=998, N/S is 8 and B/8 is 124.75. This means that the starting block address B begins in native block 124 with a three-fourths offset from the start address of native block 124. The offset value then is 0.75× 4,096 or 3,072 bytes.

Step 68 then generates a conversion transfer length. This length is computed by adding the offset value to the product of S and L and dividing by N. For the above example, with L=13, S×L=6,656 bytes, 6,656+3072=9,728 bytes and 9,728/4,096=2.375 native blocks. That is, the 13 blocks of 512 bytes begin with byte 3,072 in native block 124 and end with byte 1,536 of native block 126. Thus, three native blocks are needed. From a computation standpoint, the result of the conversion transfer length calculation will always be rounded up.

Step 64 then executes the command with the conversion block address of step 58, the offset value of step 66 and the conversion transfer length of step 68.

Continuing with the above example, if the command is a read command, command execution program 26 reads data from disk 14 beginning with native block 124 and a native transfer length of 3 blocks or 12,288 bytes and stores the read data in a buffer in data buffer area 20. Then using the offset value, command execution program 26 transfers 6,656 bytes to host computer 12.

If the command is a write command, command execution program 26 transfers 6,656 bytes of data from host computer 12 to a first buffer in data buffer area 20. Then using the conversion command block address (124) and the conversion command transfer length (3), 12,288 bytes of data (three native blocks) are read to a second buffer in data buffer area 20. Next, 6,656 bytes of data are transferred from the first buffer to the second buffer beginning with offset value 3,072, the remainder of the data being retained in the second buffer. The three native blocks of data contained in the second buffer is then written to disk 14 beginning with native block address 124.

As another example, consider that N=512 bytes, S=4,096 bytes, B=998 and L=13. Step 58 will calculate the conversion command address as B×S/N (998×4,096/512=7,984). Step 60 will determine that S/N is an integer (4,096/512=8). Step 62 will calculate the conversion transfer length as L×S/N (13×4,096/512=104). Step 64 will then execute the command using a native block address of 7,984 and a conversion command transfer length of 104 native blocks.

It will be apparent to those skilled in the art that the command need not contain the actual size S. Rather, The block size S can be in the mode page 32 and the command may include a flag of one or more bits that signifies the block size S in mode page 32. It will be apparent to those skilled in the art that that though shown and described herein as implemented in software, address conversion program 24 could be implemented in either firmware or hardware. It will also be apparent to those skilled in the art that though the illustrated embodiment shows only two block sizes, other embodiments may have more than two block sizes with the block size for a command being carried by the command information.

The present invention having been thus described with particular reference to the preferred forms thereof, it will be obvious that various changes and modifications may be made therein without departing from the spirit and scope of the present invention as defined in the appended claims.

What is claimed is:

1. A disk drive operable with a host computer, said disk drive comprising:

a disk for storing blocks of data;

a processor;

a mode buffer for storing a mode page that contains a first field signifying a native block size N;

a command buffer for storing a command received from said host computer, said command including a second field signifying a command block size S and a third field signifying a command block address B;

an address conversion program responsive to S and N being unequal to operate said processor to generate a converted command block address; and a command execution program for operating said processor to execute said command with accesses to said disk using said command block address if S equals N, and using said converted command block address if S is not equal to N.

2. The disk drive of claim 1, wherein said command includes a fourth field signifying a command block transfer length L;

wherein said address conversion program is responsive to S and N being unequal to generate a converted command block transfer length; and wherein said command execution program uses said command block length for data accesses if S equals N and uses said converted command block length for data accesses if S is not equal to N.

3. The disk drive of claim 2, wherein said converted command block address is B×S/N.

4. The disk drive of claim 3, wherein said converted command block transfer length is S/N×L, if S/N is an integer, and if S/N is not an integer, is S/N×L plus an offset divided by N and rounded up.

5. The disk drive of claim 4, wherein said offset is computed as a fractional portion times N, where the fractional portion is the decimal portion of a non-integer obtained by dividing B by N/S.

6. The disk drive of claim 5, wherein one of N and S is 4,096 bytes and the other is 512 bytes.

7. A method of operating a disk drive, said method comprising:

(a) storing a mode page that contains a first field signifying a native block size N;

(b) storing a command that contains a second field signifying a command block size S and a third field signifying a command block address B;

(c) if S is not equal to N, converting said command block address to a converted address; and (d) executing said command with said command block address if S and N are equal and with said converted command block address if S and N are unequal.

8. The method of claim 7, wherein said command includes a fourth field signifying a command block transfer length L;

wherein step (c) further converts said command block transfer length to a converted command block transfer length if S and N are unequal; and wherein step (d) uses said command block length for data accesses if S equals N and uses said converted command block length for data accesses if S is not equal to N.

9. The method of claim 8, wherein said converted command block address is B×S/N.

10. The method of claim 9, wherein said converted command block transfer length is S/N×L, if S/N is an integer, and if S/N is not an integer, is S/N×L plus an offset divided by N and rounded up.

11. The method of claim 10, wherein said offset is computed as a fractional portion times N, where the fractional portion is the decimal portion of a non-integer obtained by dividing B by N/S.

12. The method of claim 11, wherein one of N and S is 4,096 bytes and the other is 512 bytes.

13. A memory media for controlling a disk drive having a processor, a memory and a disk, said memory media comprising:

means for controlling said disk drive to perform the steps of:

(a) storing a mode page that contains a first field signifying a native block size N;

(b) storing a command that contains a second field signifying a command block size S and a third field signifying a command block address B;

(c) if S is not equal to N, converting said command block address to a converted address; and (d) executing said command with said command block address if S and N are equal and with said converted command block address if S and N are unequal.

14. The memory media of claim 13, wherein said command includes a fourth field signifying a command block transfer length L;

wherein step (c) further converts said command block transfer length to a converted command block transfer length if S and N are unequal; and wherein step (d) uses said command block length for data accesses if S equals N and uses said converted command block length for data accesses if S is not equal to N.

15. The memory media of claim 14, wherein said converted command block address is B×S/N.

16. The memory media of claim 15, wherein said converted command block transfer length is S/N×L, if S/N is an integer, and if S/N is not an integer, is S/N×L plus an offset divided by N and rounded up.

17. The memory media of claim 16, wherein said offset is computed as a fractional portion times N, where the fractional portion is the decimal portion of a non-integer obtained by dividing B by N/S.

18. The memory media of claim 17, wherein one of N and S is 4,096 bytes and the other is 512 bytes.

* * * * *